United States Patent
Futatsugi

(10) Patent No.: US 7,457,840 B2
(45) Date of Patent: Nov. 25, 2008

(54) COMMUNICATING METHOD OF INFORMATION SHARING NETWORK, INFORMATION PROCESSING APPARATUS, AND ITS CONTROL METHOD

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/452,308

(22) Filed: Jun. 3, 2003

(65) Prior Publication Data

US 2003/0233442 A1    Dec. 18, 2003

(30) Foreign Application Priority Data

Jun. 14, 2002  (JP)  .............. 2002-174245

(51) Int. Cl.
  *G06F 15/16*   (2006.01)
(52) U.S. Cl. ........................... 709/205; 709/248
(58) Field of Classification Search ......... 709/200–206, 709/217–219, 238–245, 248; 717/174–178
See application file for complete search history.

(56) References Cited

U.S. PATENT DOCUMENTS

| | | | | |
|---|---|---|---|---|
| 5,978,842 A | | 11/1999 | Noble et al. ................ | 709/218 |
| 6,047,319 A | * | 4/2000 | Olson ......................... | 709/223 |
| 6,990,561 B2 | | 1/2006 | Yae | |
| 7,013,347 B1 | * | 3/2006 | Moen ......................... | 709/238 |
| 2001/0020250 A1 | * | 9/2001 | Campbell et al. ........... | 709/224 |
| 2002/0016959 A1 | * | 2/2002 | Barton et al. ............... | 717/178 |
| 2002/0194256 A1 | * | 12/2002 | Needham et al. ........... | 709/201 |

FOREIGN PATENT DOCUMENTS

| | | |
|---|---|---|
| JP | 6-314248 | 11/1994 |
| JP | 10-171700 | 6/1998 |
| JP | 2001-67283 | 3/2001 |
| JP | 2001-331469 | 11/2001 |
| JP | 2002-158673 | 5/2002 |

* cited by examiner

*Primary Examiner*—Yasin M Barqadle
(74) *Attorney, Agent, or Firm*—Fitzpatrick, Cella, Harper & Scinto

(57) ABSTRACT

A plurality of terminals connected to a network distribution-process update notifications of information and data obtainment, thereby constructing an information notifying network which needs no server. In the network constructed by a plurality of terminals, when the user updates the information on the terminal, each terminal functions as an information provider terminal for informing another terminal that the information has been updated and transferring the updated information, and when another user updates the information on another terminal, each terminal functions as an information receiver terminal for receiving the update notification from the information provider terminal and the updated information.

14 Claims, 14 Drawing Sheets

| | |
|---|---|
| 1301 | ADVERTISEMENT TYPE = NOTICE |
| 1302 | GROUP ID = ID 0 |
| 1303 | ADVERTISEMENT NUMBER = 12345 |
| 1304 | SENDER ADDRESS = TERMINAL 1 |
| 1305 | INFORMER ADDRESS = TERMINAL 1 |
| 1306 | INFORMATION OBJECT ID = A0001 |
| 1307 | THE NUMBER OF HOPS = 1 |
| 1308 | EXPIRATION DATE = 20011231 |

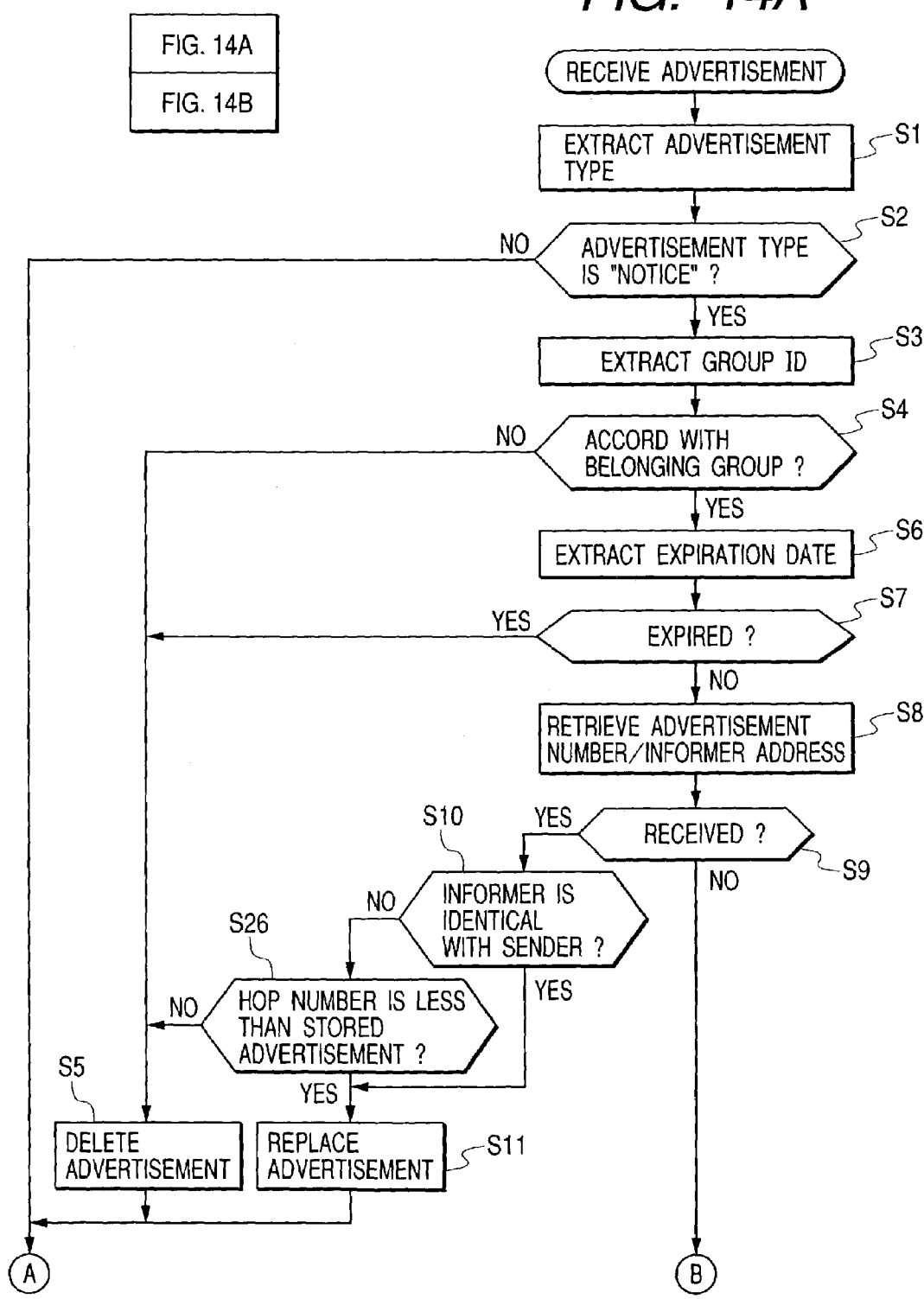

FIG. 15

| | |
|---|---|
| 1401 | GROUP ID=ID 0 |
| 1402 | ADVERTISEMENT NUMBER=12345 |
| 1403 | INFORMATION OBJECT ID=A0001 |
| 1404 | SENDER ADDRESS=TERMINAL 2 |

FIG. 16

| |
|---|
| ADVERTISEMENT TYPE = NOTICE |
| GROUP ID = ID 0 |
| ADVERTISEMENT NUMBER = 12345 |
| SENDER ADDRESS = TERMINAL 2 |
| INFORMER ADDRESS = TERMINAL 1 |
| INFORMATION OBJECT ID = A0001 |
| THE NUMBER OF HOPS = 1 |
| EXPIRATION DATE = 20011231 |

COMMUNICATING METHOD OF INFORMATION SHARING NETWORK, INFORMATION PROCESSING APPARATUS, AND ITS CONTROL METHOD

BACKGROUND OF THE INVENTION

1. Field of the Invention

The invention relates to a communicating method of a network which shares information, an information processing apparatus, and its control method.

2. Related Background Art

In recent years, providing of information using WWW (World Wide Web) has rapidly been spread. The user accesses various information which is provided by WWW, selects necessary information, and uses it.

In WWW, an information provider asynchronously and irregularly updates the information. Therefore, the user needs to actively access several Web servers in order to always obtain the latest information and confirm by himself whether new information has been added or not, the information which had been provided before has been changed or not, or the like.

In order to obtain information which the user requires an emergency such as information regarding discovery of a new type of virus or a security hole, information of new products which are registered into an auction site, and the like, it is necessary to access the Web server at the frequency according to the emergency, so that the user is burdened.

To reduce such a burden, a system in which update of the information on the Web site is detected and informed to the user exists conventionally. For example, in the system proposed in JP-A-10-171700, a WWW server itself detects update of a file on the server and informs the user of it. As proposed in JP-A-2001-67283, a system in which when a document registered by the user is updated, it is informed by mail, or the like exists.

However, according to the above conventional systems, since the system for detecting the update and informing is operated on one server, there is a problem such that in association with an increase in number of users, an excessive load is caused to the server to which a very large number of processes are unitarily concentrated. Further, there is a problem of weakness such that when the server for operating the system stops, all services are stopped.

On the other hand, in a system proposed in U.S. Pat. No. 5,978,842, there has been disclosed a method whereby the update detecting process is executed by an individual client who receives an update notification of the document and the server executes only the sum and notification of update detection results. According to such a method, it can be expected that an effect is exercised in terms of an object to reduce a load that is applied to the server. However, the processes regarding the notification are still concentrated on the server and an improvement regarding the weakness as mentioned above is not made yet.

In JP-A-06-314248, there has been disclosed a system in which when information of the own terminal is updated, each terminal in a group informs all terminals in the group that the information has been updated and exchanges the information. However, according to the system disclosed in JP-A-06-314248, since each terminal informs all of the terminals that the information has been updated, a load of the terminal in which the information has been updated is large and each terminal can share the information only together with the terminal with which each terminal can directly communicate.

SUMMARY OF THE INVENTION

It is an object of the invention that in the case of constructing a distributed-type network which needs no server, all of the users can immediately obtain updated information.

Another object of the invention is that even if there is no server, a group is formed together with a terminal with which each terminal cannot directly communicate, thereby enabling information to be shared in the group.

Still another object of the invention is that when information on a terminal is updated, another terminal independently relays a notification of the update, thereby enabling the information to be shared in the group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a constructional diagram of an update data request message;

FIG. 16 is a constructional diagram of the Notice advertisement which is transferred;

DETAILED DESCRIPTION OF THE PREFERRED EMBODIMENTS

Embodiments of the invention will be described hereinbelow with reference to the drawings.

First Embodiment

<Construction of a Network System>

Figure 1:
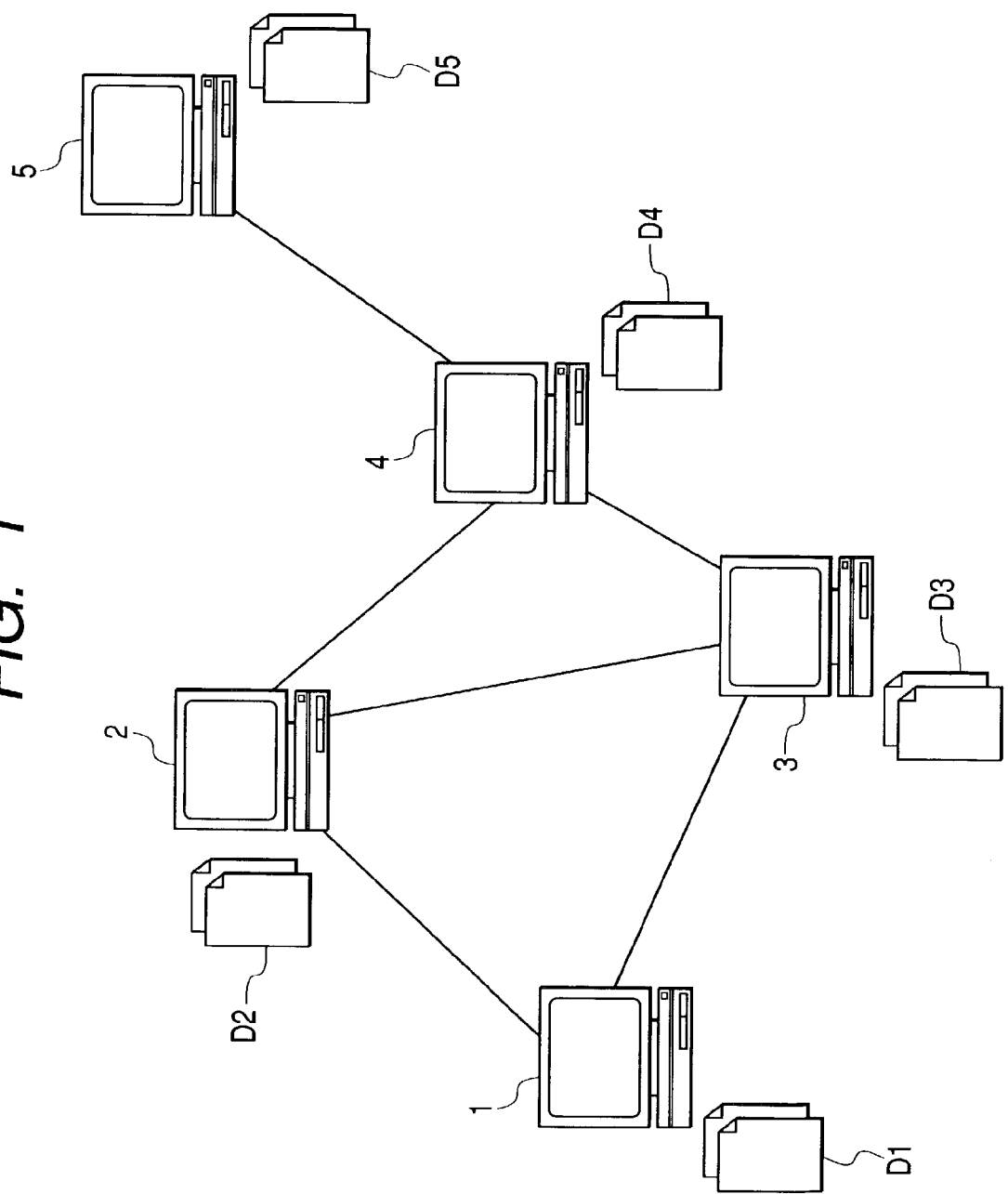
FIG. 1 is a diagram showing a whole construction of a network system according to the first embodiment.

FIG. 1 is a diagram showing a whole construction of a network system according to the first embodiment of the invention.

The network system is constructed by information notifying terminals 1 to 5. The terminals 1 to 5 are connected to a network and each of them has functions for informing other terminals that data D1 to D5 on each terminal has been updated and receiving notifications from the other terminals. Since addresses of the terminals 1 to 5 have previously and mutually been registered in them, they directly make communication with each other.

First, the operation of the system will be briefly explained with respect to an example in the case where the terminal 1 informs. The terminal 1 informs the terminals 2 and 3 that the data D1 has been updated. The terminals 2 and 3 which received the notification from the terminal 1 request obtainment of the updated data from the terminal 1. The terminal 2 transfers the notification from the terminal 1 to the terminals 3 and 4. The terminal 3 transfers the notification from the terminal 1 to the terminals 2 and 4, respectively. The terminal 4 which received the notifications from the terminals 2 and 3 requests the updated data from the terminal 2 or 3 and transfers the notification to the terminal 5.

The terminal 2 or 3 which received the data obtaining request from the terminal 4 transfers the update data obtained from the terminal 1 to the terminal 4. The terminal 5 which received the notification from the terminal 4 requests obtainment of the updated data from the terminal 4. The terminal 4 transfers the update data obtained from the terminal 2 or 3 to the terminal 5. Since the update notification at the terminal 1 is obtained by all of the other terminals, the present system functions.

In the embodiment, a virtual network (network system) constructed by the group of terminals is called an information group, and the terminals (and the users of the terminals) which form the information group are called participants. One information group has one group management number which is shared among the participants. The participant who participates in a plurality of information groups discriminates to which group the notification is sent on the basis of the group management number. Details of the group management number will be described hereinlater.

<Construction of the Information Notifying Terminal>

Figure 2:
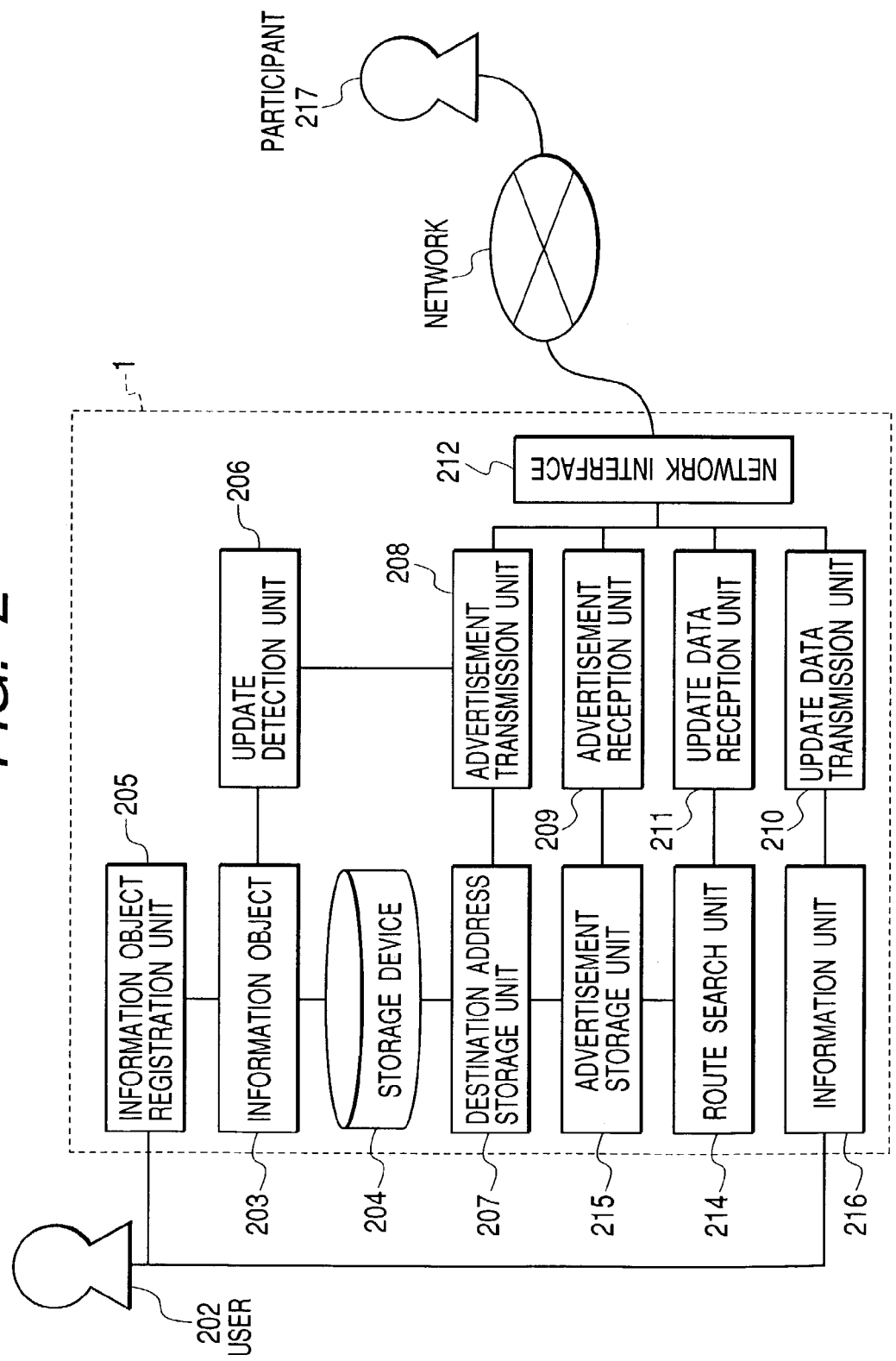
FIG. 2 is a constructional diagram of an information notifying terminal forming an information group shown in FIG. 1.

FIG. 2 is a constructional diagram of the information notifying terminal forming the information group shown in FIG. 1. The terminal 1 will be explained as an example. Each of the other terminals 2 to 5 has a construction similar to that of the terminal 1.

Reference numeral 202 denotes a user who uses the present system. The user 202 transmits information of an update notification to a participant 217 via the terminal 1 and receives the update notification information from the participant 217. An information object 203 is a set of data which the user intends to inform the update. The information object 203 has been recorded in a storage device 204 on the terminal 1. The user registers the information object 203 by an information object registration unit 205. An update detection unit 206 monitors the data registered in the information object 203, thereby detecting the update.

The address of the participant 217 as a destination of the update has been recorded in a destination address storage unit 207. An advertisement transmission unit 208 forms an advertisement to inform the participant 217 that the data has been updated and transmits the formed advertisement via a network interface 212. An advertisement reception unit 209 receives the advertisement from the participant 217.

An update data transmission unit 210 transmits the actual update data to the participant 217 via the network interface 212. An update data reception unit 211 receives the update data from the participant 217. A route search unit 214 determines a transfer destination at the time of transferring the advertisement and the update data received from the participant 217 to another participant and an obtainment destination of the update data. An advertisement storage unit 215 stores the received advertisement for a predetermined period of time. An information unit 216 informs the user of the update notification received from the participant 217.

<Participation in the Information Group>

Figure 3:
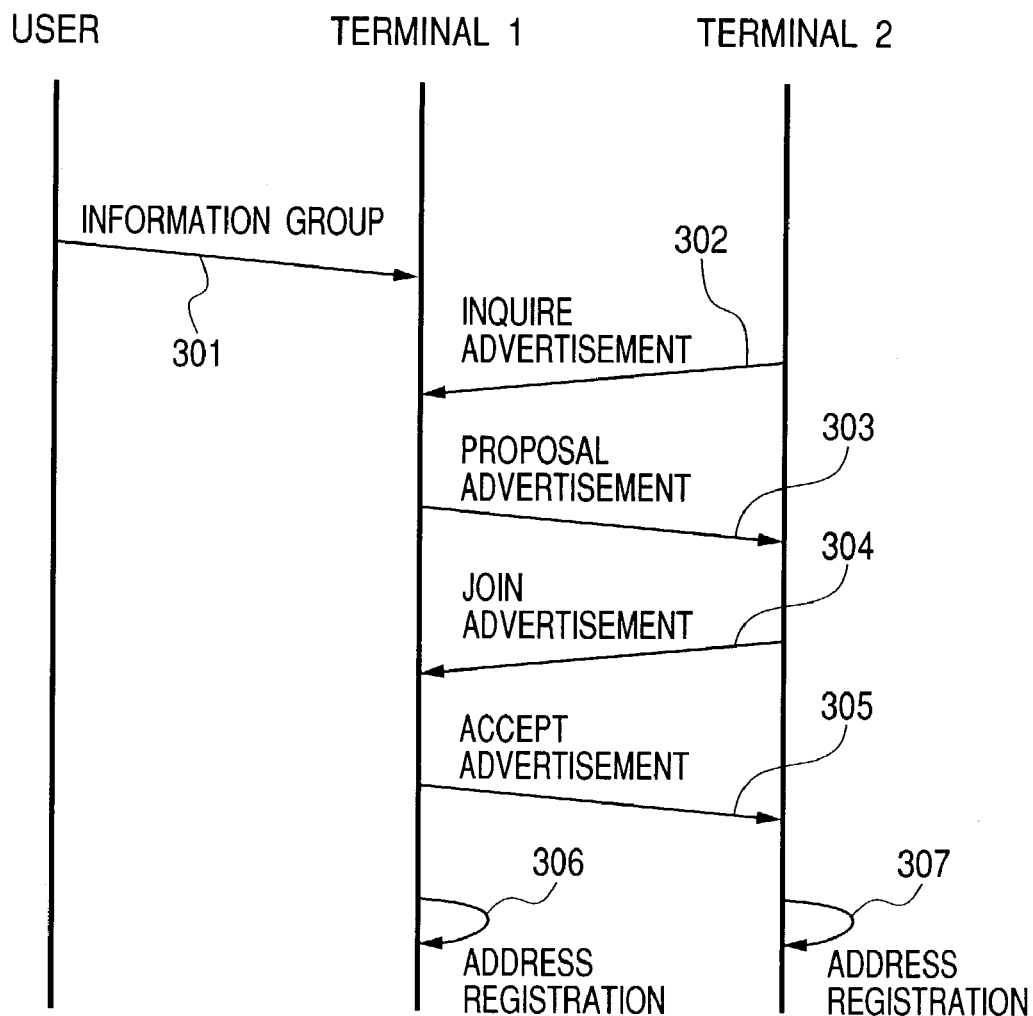
FIG. 3 is a sequence chart showing a procedure for participating in the information group.

First, the participation in the information group will be described with reference to a sequence chart of FIG. 3.

First, one information group is formed on the terminal of the user who wants to inform (301). Although such a terminal is assumed to be the terminal 1 here, any terminal can be used. A unique ID (for example, a combination of a global IP address of the terminal 1 and a date/time of creation of the group, or the like) is allocated to the information group. The terminal 1 in which the creation of the group has been finished enters a state where connection from another terminal can be received.

Figure 4:
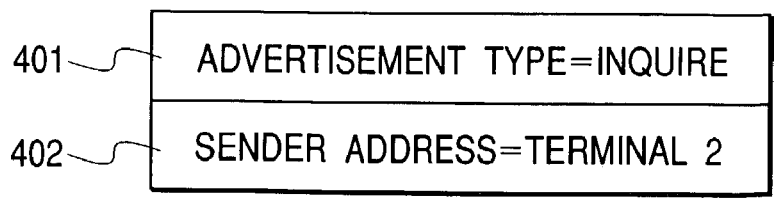
FIG. 4 is a constructional diagram of an Inquire advertisement.

Subsequently, the terminal 2 of the user who wants to receive the notification transmits an Inquire advertisement to the terminal 1 (302). FIG. 4 shows the Inquire advertisement. In this diagram, an advertisement type (401) denotes a type of this advertisement and "Inquire" has been written there. A sender address (402) is a sender address (the terminal 2 here) of this advertisement.

Figure 5:
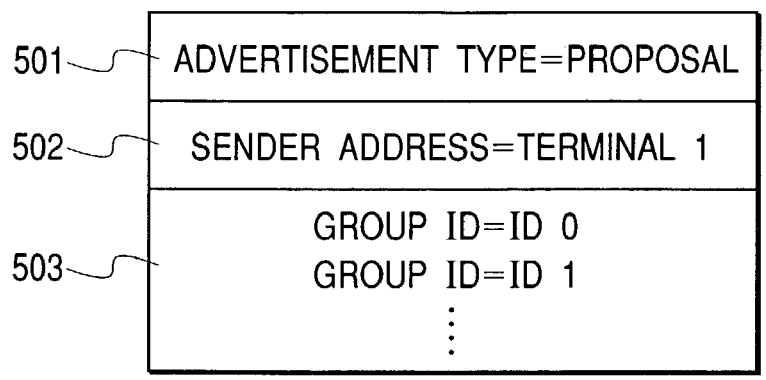
FIG. 5 is a constructional diagram of a Proposal advertisement.

The terminal 1 which received the Inquire advertisement transmits a Proposal advertisement to the terminal 2 and informs the terminal 2 of the ID of the information group provided by the terminal 1 (303). FIG. 5 shows the Proposal advertisement. In this diagram, an advertisement type (501) denotes a type of this advertisement and "Proposal" has been written there. A sender address (502) is a sender address (the terminal 1 here) of this advertisement. A group ID list (503) indicates identifiers of the information groups provided by the terminal 1.

Figure 6:
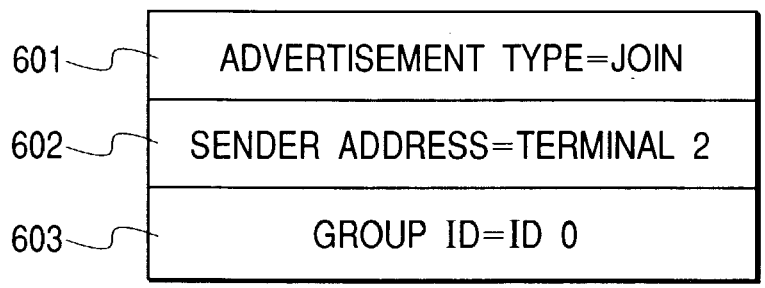
FIG. 6 is a constructional diagram of a Join advertisement.

The user of the terminal 2 selects a group in which he wants to participate from the list of participating groups, and transmits a Join advertisement to the terminal 1 (304). FIG. 6 shows the Join advertisement. In FIG. 6, an advertisement type (601) denotes a type of this advertisement and "Join" has been written there. A sender address (602) is a sender address (the terminal 2 here) of this advertisement. A group ID (603) is an identifier of the information group in which the terminal 2 wants to participate.

Figure 7:
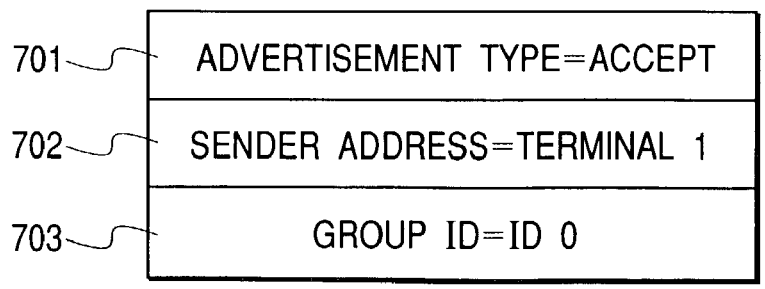
FIG. 7 is a constructional diagram of an Accept advertisement.

The terminal 1 which received the Join advertisement transmits an Accept advertisement to the terminal 2 (305). FIG. 7 shows the Accept advertisement. In FIG. 7, an advertisement type (701) denotes a type of this advertisement and "Accept" has been written there. A sender address (702) is a sender address (the terminal 1 here) of this advertisement. A group ID (703) is an identifier of the information group in which the terminal 1 admits the participation of the terminal 2. After completion of the transmission and reception of the Accept advertisement, each of the terminals 1 and 2 registers the partner's address into the destination address storage unit (306, 307). Thus, a virtual path is provided between the terminals 1 and 2 and the procedure for participating into the information group is completed.

Each terminal which participates in the information group can accept the participation from another terminal in a manner similar to the terminal which formed the information group. A participating procedure in this case is also similar to that shown in FIG. 3. One terminal can also apply for the participation to a plurality of terminals belonging to the same information group. For example, there is also a case where after the terminal 3 applied for the participation to the terminal 2, it applies for the participation to the terminal 1. By this method, a virtual path is provided between the terminals 1 and 2, thereby enabling its existence to be informed.

When the terminal participates in the information group, a kind of authentication can be made. However, it is not specified in the invention. The procedure for participating in the information group has been described above.

<Withdrawal from the Information Group>

Figure 8:
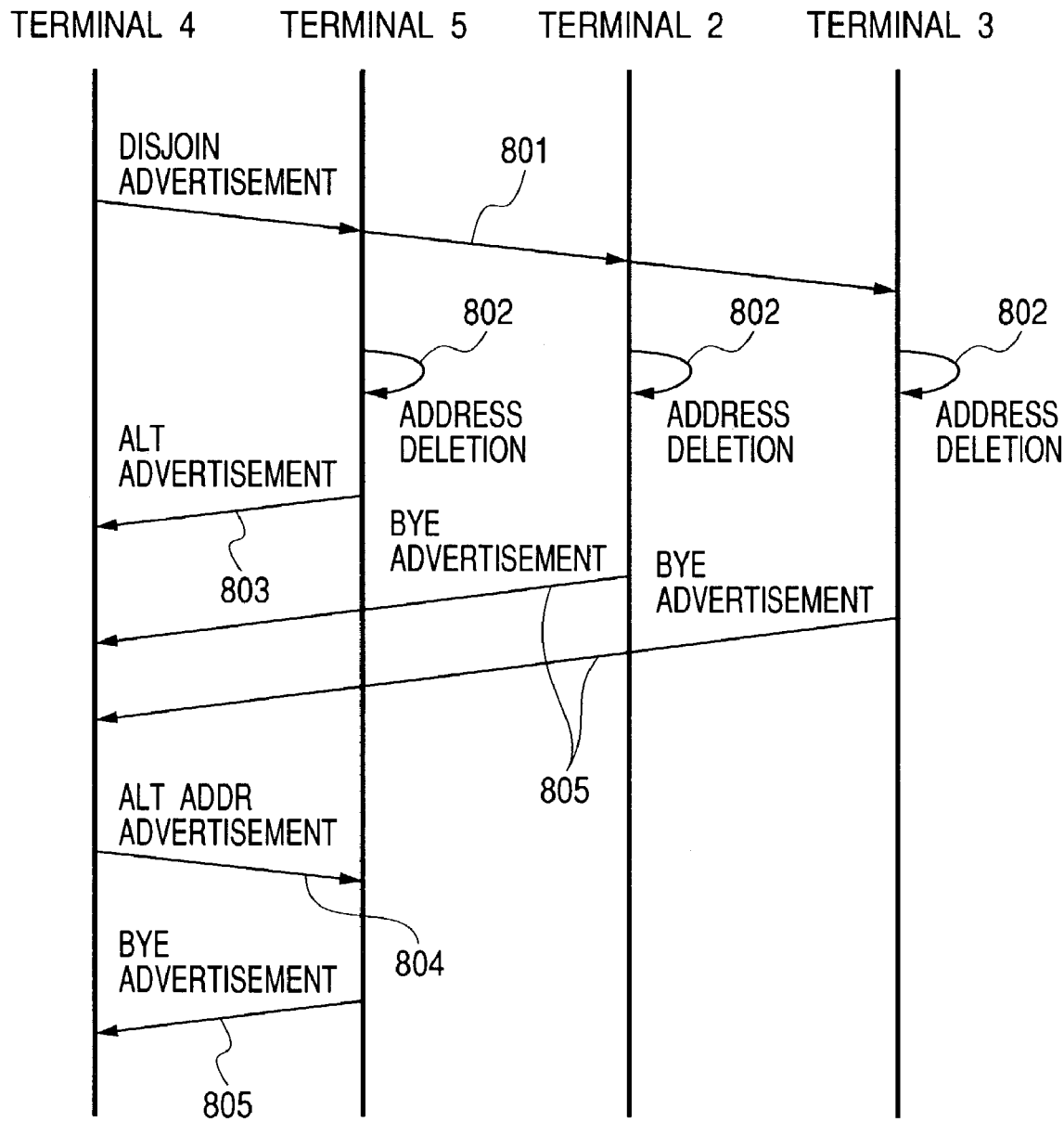
FIG. 8 is a sequence chart showing a procedure for withdrawing from the information group.

Subsequently, the withdrawal from the information group will be explained with reference to a sequence chart of FIG. 8. A case where the terminal 4 withdraws in FIG. 1 will be described here as an example.

Figure 9:
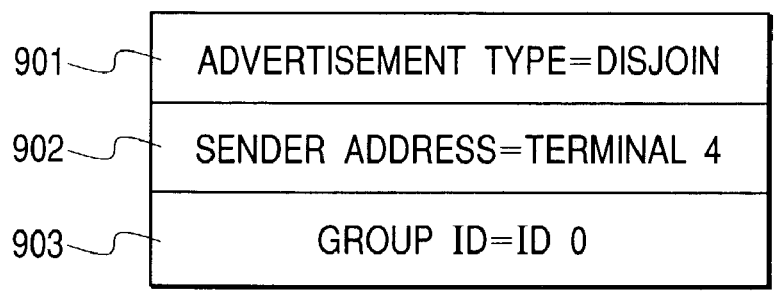
FIG. 9 is a constructional diagram of a DisJoin advertisement.

First, the terminal 4 transmits the DisJoin advertisement to all of the terminals (the terminals 2, 3, and 5 here) registered in the destination address storage unit (801). FIG. 9 shows the DisJoin advertisement. In this diagram, an advertisement type (901) denotes a type of this advertisement and "DisJoin" has been written there. A sender address (902) is a sender address (the terminal 4 here) of this advertisement. A group ID (903) is an identifier of the information group from which the terminal 4 wants to withdraw.

Figure 10:
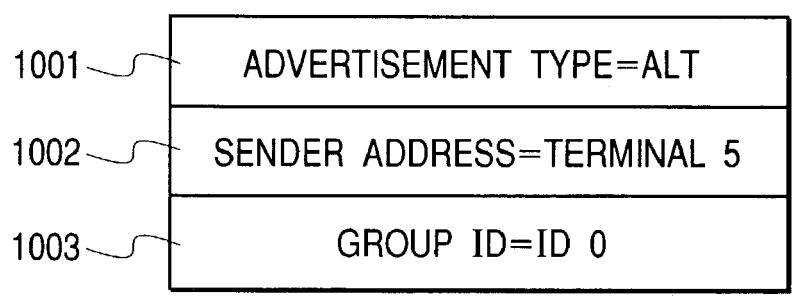
FIG. 10 is a constructional diagram of an Alt advertisement.

Each terminal which received the DisJoin advertisement deletes the sender address of the DisJoin advertisement from the address registered in the destination address storage unit (802). The terminal in which only the sender address of the DisJoin advertisement has been registered in a destination address and another destination address is necessary (for example, like a terminal 5 in FIG. 1, in the case where the terminal participates only in the terminal 4) transmits an Alt advertisement to the sender of the DisJoin advertisement and requests another address therefrom (803). FIG. 10 shows the Alt advertisement. In this diagram, an advertisement type (1001) denotes a type of this advertisement and "Alt" has been written there. A sender address (1002) is a sender address (the terminal 5 here) of this advertisement. A group ID (1003) is an identifier of the information group written in the DisJoin advertisement.

Figure 11:
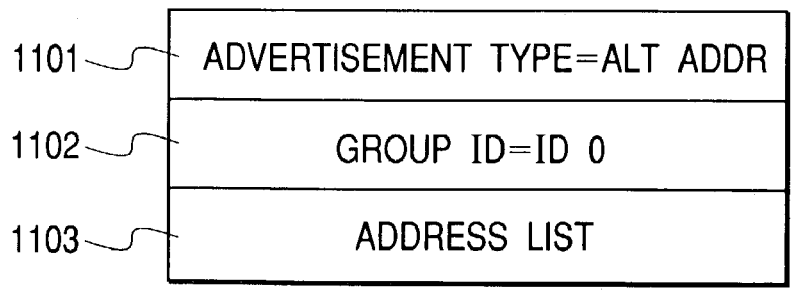
FIG. 11 is a constructional diagram of an AltAddr advertisement.

The terminal which received the Alt advertisement allows the addresses other than the sender address of the Alt advertisement among the addresses registered in the destination address storage unit to be included in an AltAddr advertisement and transmits the resultant AltAddr advertisement to the sender (the terminal 5) of the Alt advertisement (804). FIG. 11 shows the AltAddr advertisement. In this diagram, an advertisement type (1101) denotes a type of this advertisement and "AltAddr" has been written there. A group ID (1102) is an identifier of the information group written in the DisJoin advertisement. An address list (1103) is a list of addresses registered in the destination address storage unit.

The terminal which transmitted the DisJoin or Alt advertisement and received the AltAddr advertisement transmits a Bye advertisement to the sender of the DisJoin advertisement (805). The withdrawal of the terminal 5 is completed at the stage where the Bye advertisements are received from all senders to which the DisJoin advertisements were transmitted. The withdrawing procedure has been described above.

<Extinction of the Information Group>

Extinction of the information group will be subsequently explained.

The extinction of the information group occurs when the number of participants is equal to 2 (assumed to be terminals A and B) and one (assumed to be the terminal B) of the terminals withdraws. First, the terminal B transmits the DisJoin advertisement to the terminal A. In the terminal A, since only the terminal B has been registered in the destination address, the terminal A transmits the Alt advertisement to the terminal B in accordance with the procedure for withdrawing from the information group and requests a substitute address from the terminal B.

Also in the terminal B, since only the terminal A has been registered in the destination address, a substitute address which can be informed by the AltAddr advertisement does not exist. In this case, the terminal B transmits the AltAddr advertisement without writing anything into the address list. The terminal A which received the AltAddr advertisement in which the address list is empty transmits the Bye advertisement to the terminal B, thereby permitting the withdrawal. The terminal B which received the Bye advertisement completes the withdrawing procedure. At this point of time, the participant in the information group is only the terminal A and the information group can be extinguished.

The last participant can maintain this group. According to this method, even if the information group implementor withdraws the information group halfway, the information group can be maintained by the residual participants until the number of participants is equal to 1.

<Procedure for Informing the Update of the Data>

Figure 12:
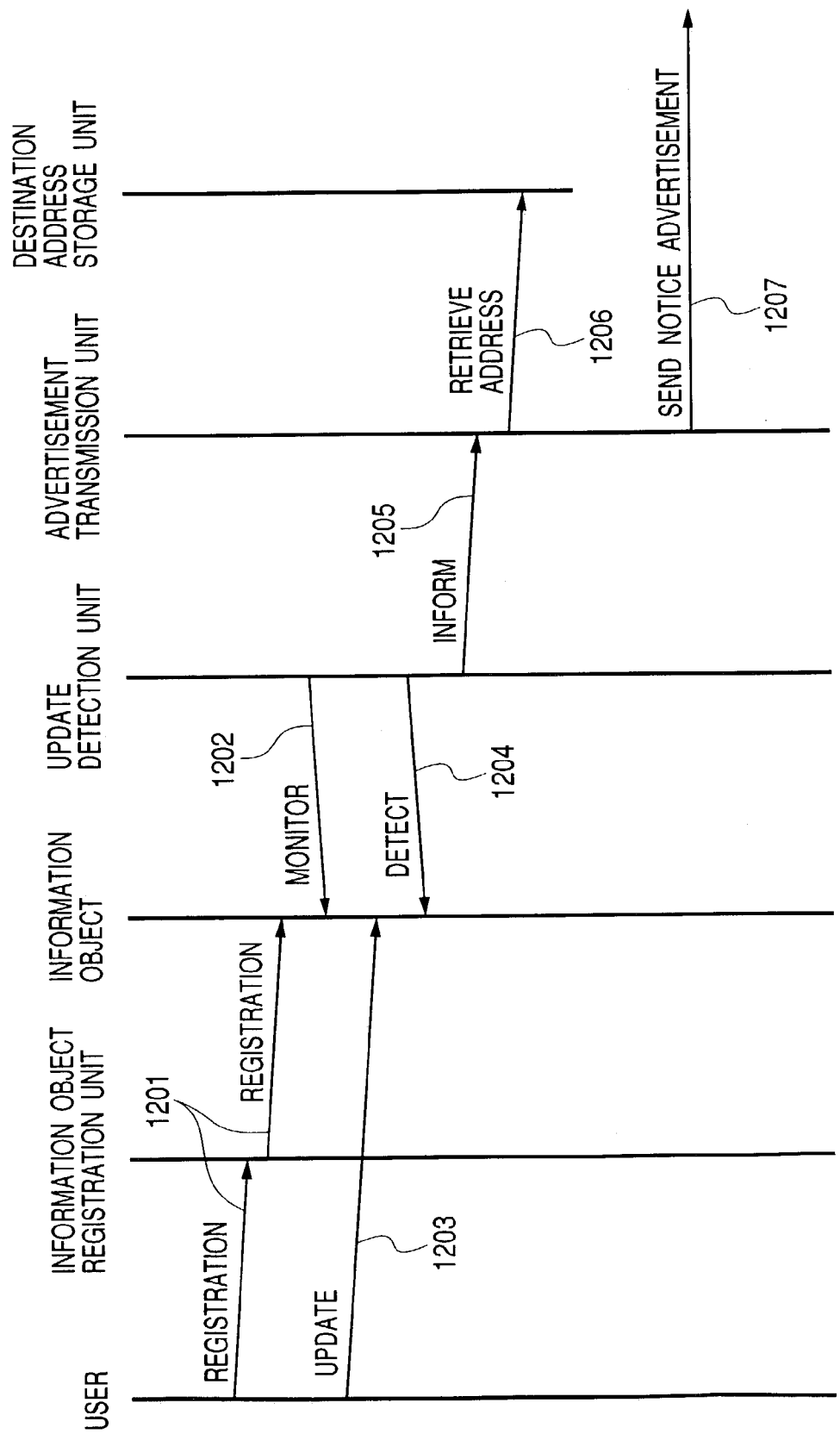
FIG. 12 is a sequence chart showing a procedure from "registration" of an information object to "send Notice advertisement"

In the system shown in FIGS. 1 and 2, the procedure for informing the other terminals (the terminals 2 to 5) that the data D1 on the terminal 1 has been updated will be described with reference to a sequence chart of FIG. 12.

In the case where the user who uses the terminal 1 informs the participants of the information group that the data D1 has been updated, first, the user registers the data D1 into the information object 203 via the information object registration unit 205 (1201).

The information object registration unit 205 allocates a unique management number to the data D1 and manages it. Although it is necessary that a management number which is allocated to the information object 203 is unique in each terminal, it can be set irrespective of the other terminals. In the terminal 1, the update detection unit 206 monitors the information object 203 (1202). When the user updates the data D1 (1203), the update detection unit 206 detects it (1204) and informs the advertisement transmission unit 208 of the management number, (1205). The advertisement transmission unit 208 which received the notification from the update detection unit 206 obtains the addresses of the participants registered in the terminal 1 from the destination address storage unit 207 (1206). In the example of FIG. 1, the participants registered in the terminal 1 are the terminals 2 and 3.

Figure 13:
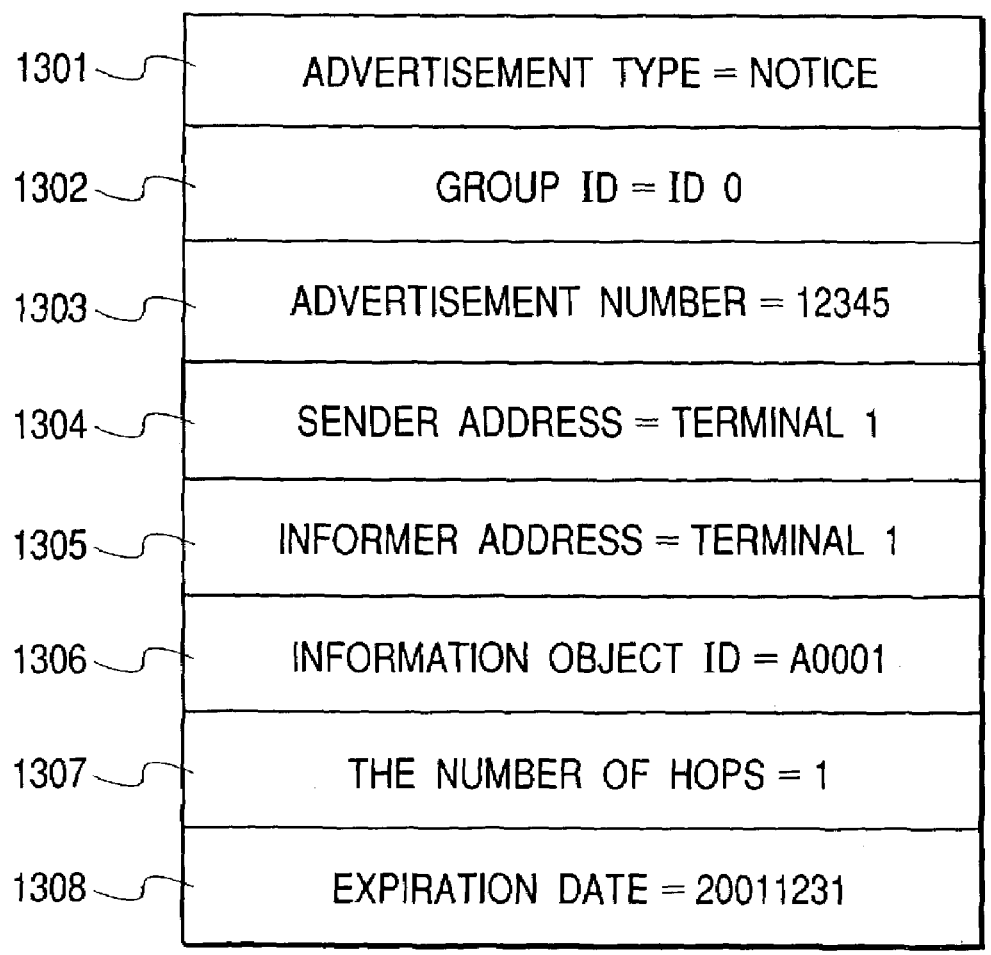
FIG. 13 is a constructional diagram of a Notice advertisement.

Subsequently, the advertisement transmission unit 208 transmits a Notice advertisement to each of the registered participants (1207). Contents of the Notice advertisement are shown in FIG. 13. In this diagram, an advertisement type (1301) denotes a type of this advertisement and "Notice" has been written there. A group ID (1302) shows an identifier of the information group which receives this advertisement. An advertisement number (1303) indicates a number which can uniquely specify the advertisement transmitted by the informer to this information group. A sender address (1304) indicates a sender address (the address of the terminal 1 here) of this advertisement. An informer address (1305) indicates an address (the address of the terminal 1 here) of the terminal which owns the updated data. An information object ID (1306) indicates an identifier of an information object which can be identified in the terminal 1. The number of hops (1307) indicates the number of times of the transfer of this advertisement which are counted from the informer (0 in this case). An advertisement expiration date (1308) indicates an expiration date of this advertisement.

<Notice Advertisement Receiving Process>

Figure 14B:
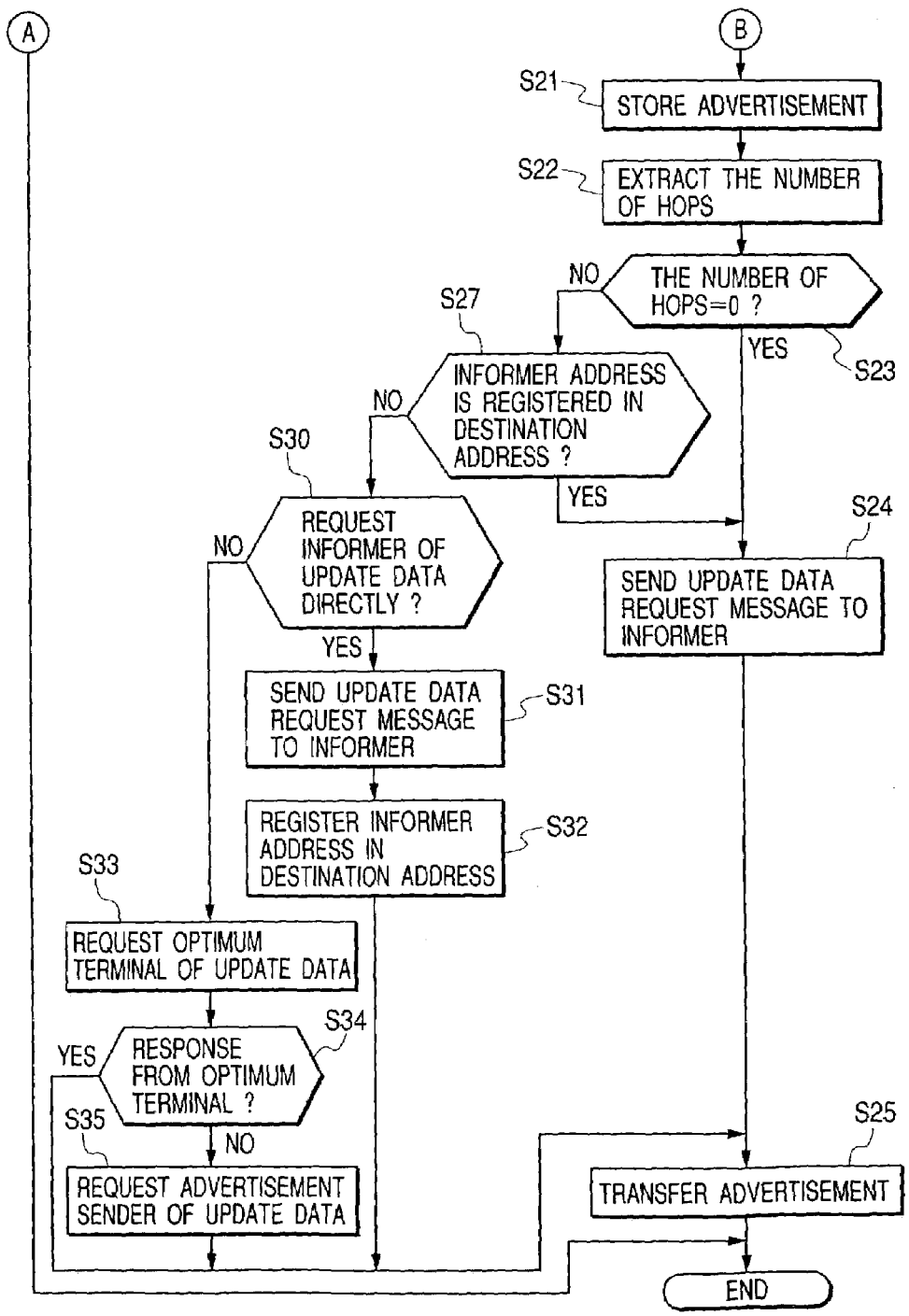
FIG. 14 is comprised of FIGS. 14A and 14B are flowcharts showing a procedure for a receiving process of an advertisement.

A Notice advertisement receiving process in the terminal 2 will now be described with reference to flowcharts of FIGS. 14A and 14B. Since the terminal 3 has a construction similar to that of the terminal 2, the terminal 2 will be described here.

In the system, as paths by which the terminal 2 receives the Notice advertisement regarding the update of the data D1, three patterns (1) from the terminal 1,
(2) from the terminal 3, and
(3) from the terminal 4 exist. Processes in the case of the pattern (1) and those in the cases of the other patterns differ.

Firstly, the case (pattern (1)) where the advertisement is received from the terminal 1 will be described. First, the terminal 2 which received the advertisement by the advertisement reception unit 209 extracts the advertisement type (step S1). If the advertisement type is "Notice" (step S2), the group ID is subsequently extracted (step S3). It is compared with the ID of the information group to which its own terminal belongs (step S4). If the group ID is different, since this means that this advertisement has erroneously been transmitted, the terminal 2 immediately deletes this advertisement and finishes the process (step S5).

If the ID is the group ID showing the information group to which its own terminal belongs, the advertisement expiration date is subsequently extracted (step S6). If the present time passes the advertisement expiration date, this advertisement is deleted and the process is finished (step S7, step S5). If the advertisement is within the expiration date, the advertisement is transferred to the route search unit 214.

First, the route search unit 214 retrieves the advertisement number and the informer address (step S8). The retrieved informer address and advertisement number are compared with those of the Notice advertisement stored in the advertisement storage unit 215. If the coincident informer address and advertisement number are found in the stored Notice advertisement (that is, in the case where the Notice advertisements from the terminals 3 and 4 have already been received) (step S9), the stored Notice advertisement is replaced with the present received Notice advertisement from the terminal 1 (that is, the advertisement in which the informer is identical with the sender) (step S10, step S11). After that, the processing routine is finished.

If the coincident informer address and advertisement number are not found in the stored Notice advertisements, the above Notice advertisement is newly stored into the advertisement storage unit 215 (step S21). The processing routine advances to an update data obtaining process (A).

In the update data obtaining process, first, the number of hops is extracted (step S22). Since the number of hops is equal to 0 in the Notice advertisement from the terminal 1 (step S23), it will be understood that the Notice advertisement has directly been received from the informer. In this case, the informer address is extracted and an update data request message is directly transmitted to the informer address (step S24). As shown in FIG. 15, the update data request message includes a same group ID (1401), an advertisement number (1402), and an information object ID (1403) as those of the received Notice advertisement, and a sender address (1404) of this message.

When the update data request message is transmitted, an advertisement transferring process is subsequently executed (step S25). Each terminal transfers the received Notice advertisement to the participants recorded in the destination address storage unit 207. In the terminal 2, the recorded participants are the terminals 1, 3, and 4. Since the terminal 1 among them is the sender of the Notice advertisement, the Notice advertisement is transferred to the terminals 3 and 4 excluding the terminal 1. As shown in FIG. 16, contents of the Notice advertisement which is transferred are substantially the same as those of the Notice advertisement received from the terminal 1 except for a point that the sender address is the address of the terminal 2 and a point that the number of hops has been increased by 1.

A case (patterns (2), (3)) where the terminal 2 received the Notice advertisements from the terminals 3 and 4 will now be described.

Since processes (steps S1 to S10) from the reception to the discrimination about the expiration date are similar to those of the pattern (1), their explanation is omitted here. A subsequent advertisement storing process will now be explained. If the Notice advertisement which coincides with the present received advertisement has been stored in the advertisement storage unit 215, the number of hops of them are compared (step S26). If the number of hops of the present advertisement is less than the stored advertisement, the stored data is replaced (step S11). In this example, if the advertisement (the number of hops=1) from the terminal 3 is received after the advertisement (the number of hops=2) from the terminal 4 was received, the advertisement from the terminal 3 is stored. Thus, the Notice advertisement in which the number of hops to the informer is minimum is always stored in the advertisement storage unit 215. After the Notice advertisement was stored, the processing routine is finished.

If the coincident Notice advertisement is not found, the present received Notice advertisement is newly stored (step S21) and the processing routine advances to the update data obtaining process (A). In the update data obtaining process, first, the number of hops is obtained (step S22). Since the received Notice advertisement has been transferred one or more times in any of the terminals, the number of hops is equal to or larger than 1 (step S23). The terminal which received the Notice advertisement in which the number of hops is equal to or larger than 1 extracts the informer address and compares it with the addresses of the participants registered in its own destination address storage unit 207 (step S27).

If the extracted informer address coincides with any of the participant addresses (in this example, the terminal 1 has been registered in the terminal 2), it is expected that this terminal will directly receive the Notice advertisement from the informer sometime. Therefore, it is regarded that this state is the same as the case where the Notice advertisement in which the number of hops is equal to 0 has been received. The update data request message is directly transmitted to the informer address (step S24). Finally, the transferring process of the advertisement is executed (step S25).

If the advertisement is received from the terminal 3, since the terminal 1 is the informer and the terminal 3 is the sender of the advertisement, the Notice advertisement is transferred to the terminal 4 excluding them. When the advertisement is received from the terminal 4, in a manner similar to the above, the Notice advertisement is transferred to the participants excluding the informer and the sender of the Notice advertisement. The contents of the Notice advertisement are substantially the same as those in the case of the pattern (1).

The advertisement receiving process in the terminal in which the informer address of the Notice advertisement has been registered in the destination address storage unit 207 has been described above.

Subsequently, a receiving process of the Notice advertisement regarding the update of the data D1 in the terminals (the terminals 4 and 5) in which the informer address is not registered in the destination address storage unit 207 will be explained.

Since processes (steps-S1 to S21) from the reception to the storage of the advertisement are similar to those of the pattern (2), their explanation is omitted here. First, the update data obtaining process (A) will be explained. Since the received Notice advertisement has been transferred one or more times in any of the terminals, the number of hops is equal to or larger than 1 (step S23). The terminal which received the Notice advertisement in which the number of hops is equal to or larger than 1 extracts the informer address and compares it with the addresses of the participants registered in its own destination address storage unit 207 (step S27). If the extracted informer address does not coincide with any of the participant addresses (in the terminals 4 and 5, the terminal 1 is not registered in the informer address), the terminals 4 and 5 can select one of the following two methods (step S30).

First, there is a method whereby the update data request message is directly transmitted to the informer address (step S31) and, at the same time, the informer address is added to the destination address storage unit 207 (step S32). Thus, a virtual path can be provided between the terminals 4 and 1 and, thereafter, the terminal 4 can directly receive the Notice advertisement from the terminal 1.

Second, there is a method whereby the update data request message is transmitted to the sender terminal (which realizes the shortest hop to the terminal 1. Hereinafter, referred to as an optimum terminal) of the Notice advertisement stored in the advertisement storage unit 215. According to this method, the terminal 4 can hold its own address in secrecy from the terminal 1. In place of it, the terminal 4 cannot directly receive the notification from the terminal 1. The sender of the received Notice advertisement does not always coincide with the optimum terminal.

Therefore, first, the update data request message is transmitted to the optimum terminal (step S33). If no response is obtained (step S34), the update data request message is transmitted to the sender of the Notice advertisement received at present (step S35). After the update data request message is transmitted by one of the above methods, finally, the transferring process of the Notice advertisement is executed (step S25). As already mentioned above, the Notice advertisement is transferred to the participants excluding the informer and the sender of the advertisement from the participants registered in the destination address storage unit 207. The contents of the Notice advertisement are substantially the same as those in the case of the pattern (1).

The Notice advertisement receiving process has been described above.

<Update Data Request Message Receiving Process>

Subsequently, an update data request message receiving process will be explained with reference to a flowchart of FIG. 17.

First, processes in the informer (the terminal 1) will be explained. In the terminal 1, a group ID, an advertisement number, and an information object ID are respectively extracted (step S72) from the received update data request message (step S71). Whether they accord with the contents of the transmitted Notice advertisement or not is discriminated (steps S73, S74). If the contents of the message are authenticated, the update data is transmitted to the sender address of the message (steps S75, S76).

Subsequently, the sender address of the message is compared with the addresses of the participants registered in the destination address storage unit 207 (step S77). If it is not registered yet, it is added (step S78).

Subsequently, processes in the terminal (the terminal 2 or 3) in which the informer address has been registered in the destination address storage unit 207 will be explained. When the terminal 2 (or 3) receives the update data request message from the terminal 4 (step S71), the group ID, advertisement number, and information object ID are extracted from the message (step S72), respectively. Whether the Notice advertisement whose contents coincide has been stored in the advertisement storage unit 215 or not is discriminated (steps S73, S79).

Figure 18:
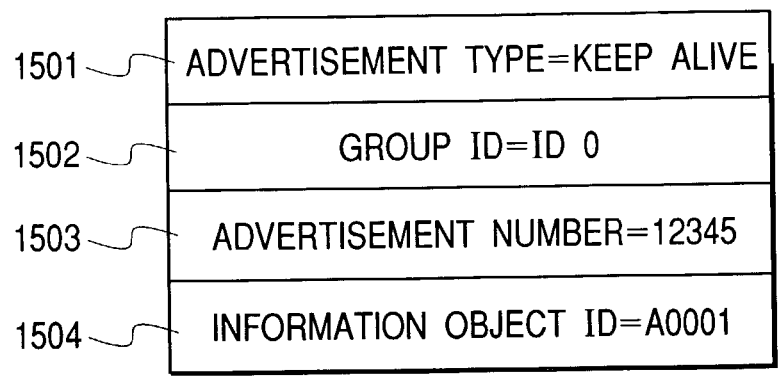
FIG. 18 is a constructional diagram of a KeepAlive advertisement.

If the Notice advertisement whose contents coincide has been found, the request is determined to be authenticated and the update data received from the informer is transferred to the sender address of the message (steps S80 to S82). If the update data cannot be received from the informer, a KeepAlive advertisement is transmitted to the terminal 4 until the update data is received (step S83). Contents of the KeepAlive advertisement are shown in FIG. 18.

Finally, processes in the terminal (the terminal 4) in which the informer address is not registered in the destination address storage unit 207 will be described. The terminal 4 which received the update data request message from the terminal 5 extracts the group ID, advertisement number, and information object ID are extracted from the message, respectively. Whether the Notice advertisement whose contents coincide has been stored in the advertisement storage unit 215 or not is discriminated. If the Notice advertisement whose contents coincide has been found, the request is determined to be legal and the update data received from the informer or the Notice advertisement sender is transferred to the sender address of the message (steps S80, S84). If the update data cannot be received from the informer, the KeepAlive advertisement is transmitted to the terminal 5 until the update data is received (step S83).

As mentioned above, according to the embodiment, since the distributed-type network in which a plurality of terminals connected to the network distribution-process the update notification of the information and the data obtainment can be constructed, the information notifying network system which needs no server can be constructed. Thus, the problem such that the loads are unitarily concentrated on the server as in the conventional technique can be avoided. Further, since the information provider himself transmits the information update by the information message and transfers the information message among the users constructing the network, all of the users can immediately obtain the updated information.

Second Embodiment

Figure 19:
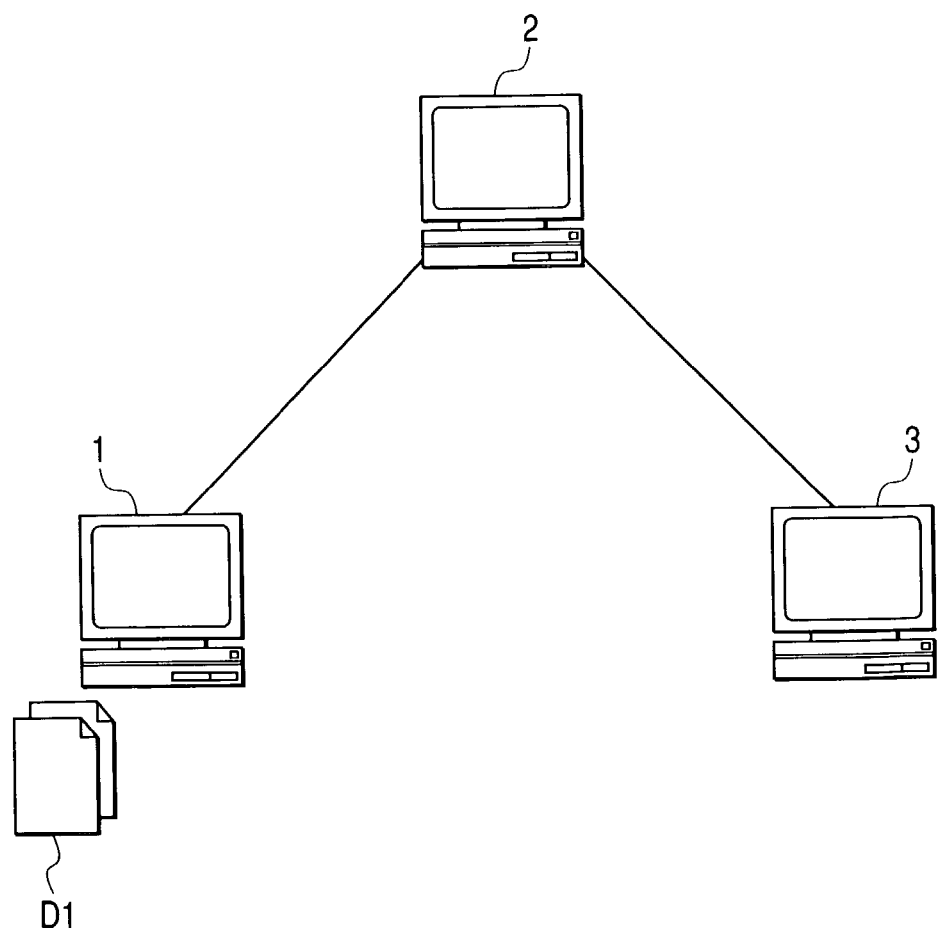
FIG. 19 is a diagram showing a whole construction of a network system according to the second embodiment.
Figure 20:
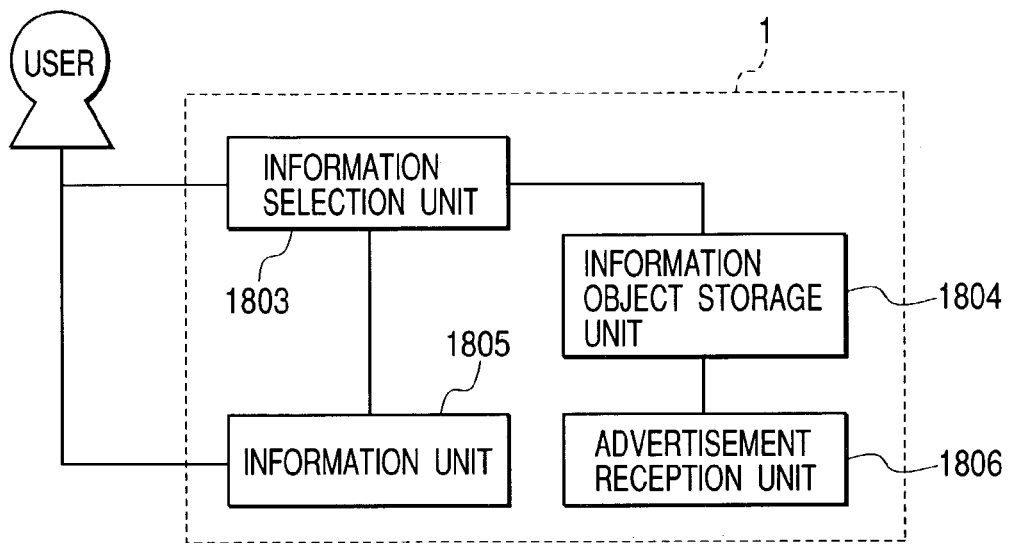
FIG. 20 is a block diagram showing a construction of an information notifying terminal according to the second embodiment.

FIG. 19 is a diagram showing a whole construction of a network system according to the second embodiment of the invention. FIG. 20 is a block diagram showing a construction of an information notifying terminal according to the second embodiment.

The network system is constructed by the information notifying terminals 1 to 3 and the terminals 1 to 3 are sequentially connected to the network system. As shown in FIG. 20, each of the terminals 1 to 3 is constructed by a notification selection unit 1803, a notification object storage unit 1804, an information unit 1805, and an advertisement reception unit 1806.

In the above construction, a case where the user of the terminal 1 designates the data D1 as an information object and informs the terminals 2 and 3 that the data has been updated will be explained.

First, transmitting and receiving processes of the Notice advertisement which are executed when the update of the data D1 is detected for the first time are similar to those in the first embodiment. In the terminal 2 (and the terminal 3) which transmitted the update data request message subsequently to the reception of the Notice advertisement and received the update data, the user discriminates whether the notification of the update of the data is necessary or not.

Figure 21:
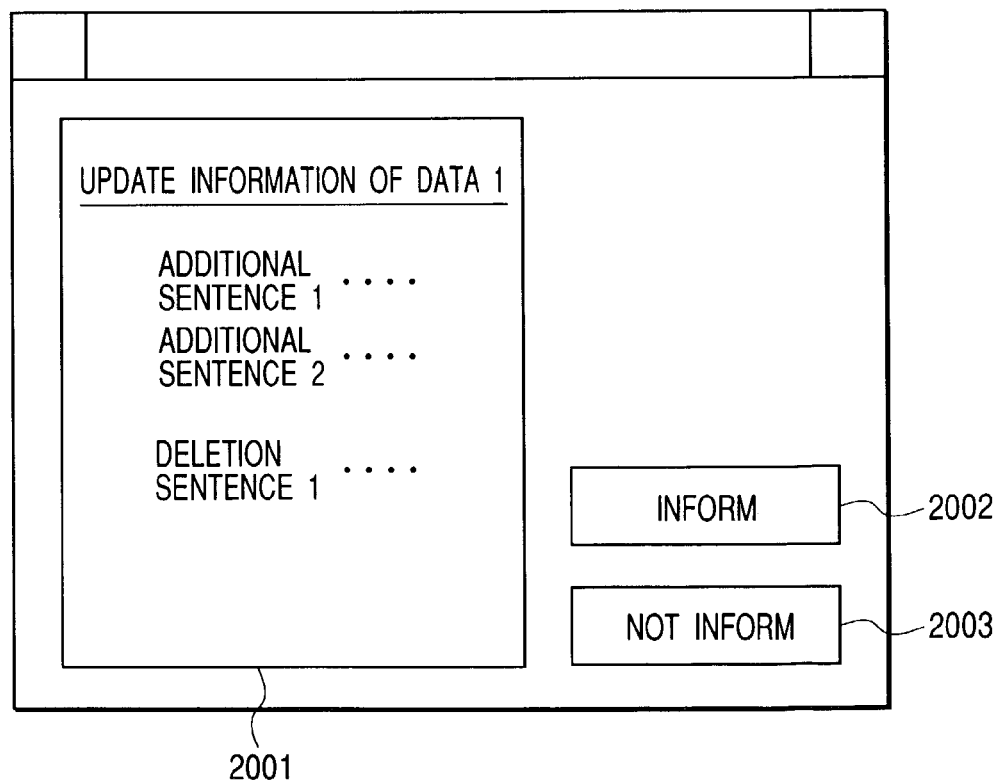
FIG. 21 is a diagram showing an example of a user interface for making notification selection.

FIG. 21 shows an example of a user interface of the notification selection unit 1803. The present received update data is displayed on a display unit 2001 in the diagram. In accordance with the contents of the update data, the user presses an "inform" button 2002 in the case of the data whose notification is desired and presses a "not inform" button 2003 if it is determined that the notification is unnecessary. In the notification selection unit 1803, a flag showing "inform"/"not inform" is added to the received Notice advertisement and stored the resultant advertisement into the notification object storage unit 1804. The processes until this stage relate to the processes in the first update notification.

Subsequently, processes in the case where the data D1 is updated again in the terminal 1 will be described.

<Case (1)>

First, the case where the update notification of the data D1 is unnecessary in the terminal 2 but is necessary in the terminal 3 will be described. The terminal 1 which detected the update of the data D1 transmits the Notice advertisement to the terminal 2. In the terminal 2, the advertisement having the same information object ID as that of the present received Notice advertisement is searched from the Notice advertisement stored in the notification object storage unit 1804. In the terminal 1, since the advertisement in which "not inform" has been set has been stored, the user is not informed but the Notice advertisement is transferred to the terminal 3.

The update data request message to the terminal 1 is not immediately transmitted. When the terminal 3 receives the Notice advertisement from the terminal 2, it transmits the update data request message to the terminal 2. The terminal 2 which received the update data request message from the terminal 3 transmits the KeepAlive advertisement to the terminal 3. At this stage, the update data request message is transmitted to the terminal 1 for the first time. When the update data is received from the terminal 1, it is transferred to the terminal 3. By the above method, the terminal 3 can receive the update notification of the data D1.

<Case (2)>

Processes in the case where the update notification of the data D1 is unnecessary in both of the terminals 2 and 3 will now be described. The processes which are executed until the terminal 2 transfers the Notice advertisement to the terminal 3 are similar to those in the case (1).

In the terminal 3 which received the Notice advertisement from the terminal 2, since the update notification of the data D1 is unnecessary and the destination terminal registered in the terminal 3 is only the terminal 2 serving as a sender of the Notice advertisement, this Notice advertisement is deleted. In the terminal 2, if the update data request message is not received from any other terminals even after the elapse of the expiration date written in the Notice advertisement, this advertisement is deleted and the update data is not obtained from the terminal 1. Owing to the above processes, the operation such that the notification and update data which are unnecessary for the user are transmitted to the network can be suppressed.

<Case (3)>

This case corresponds to a case where the update notification of the data D1 is necessary in the terminal 2 and it is unnecessary in the terminal 3. In this case, processes similar to those in the first embodiment are executed. That is, the terminal 2 which received the Notice advertisement from the terminal 1 transfers the advertisement to the terminal 3 and transmits the update data request message to the terminal 1. In the terminal 3, since the notification of the information object shown by this advertisement is unnecessary, the advertisement is deleted and the processes are finished. In the terminal 2, it waits for reception of the update data request message from the other terminal until the expiration date written in the Notice advertisement. This advertisement is deleted at a point of time after the elapse of the expiration date.

Also in the embodiment as mentioned above, effects similar to those in the first embodiment can be obtained.

Figure 17:
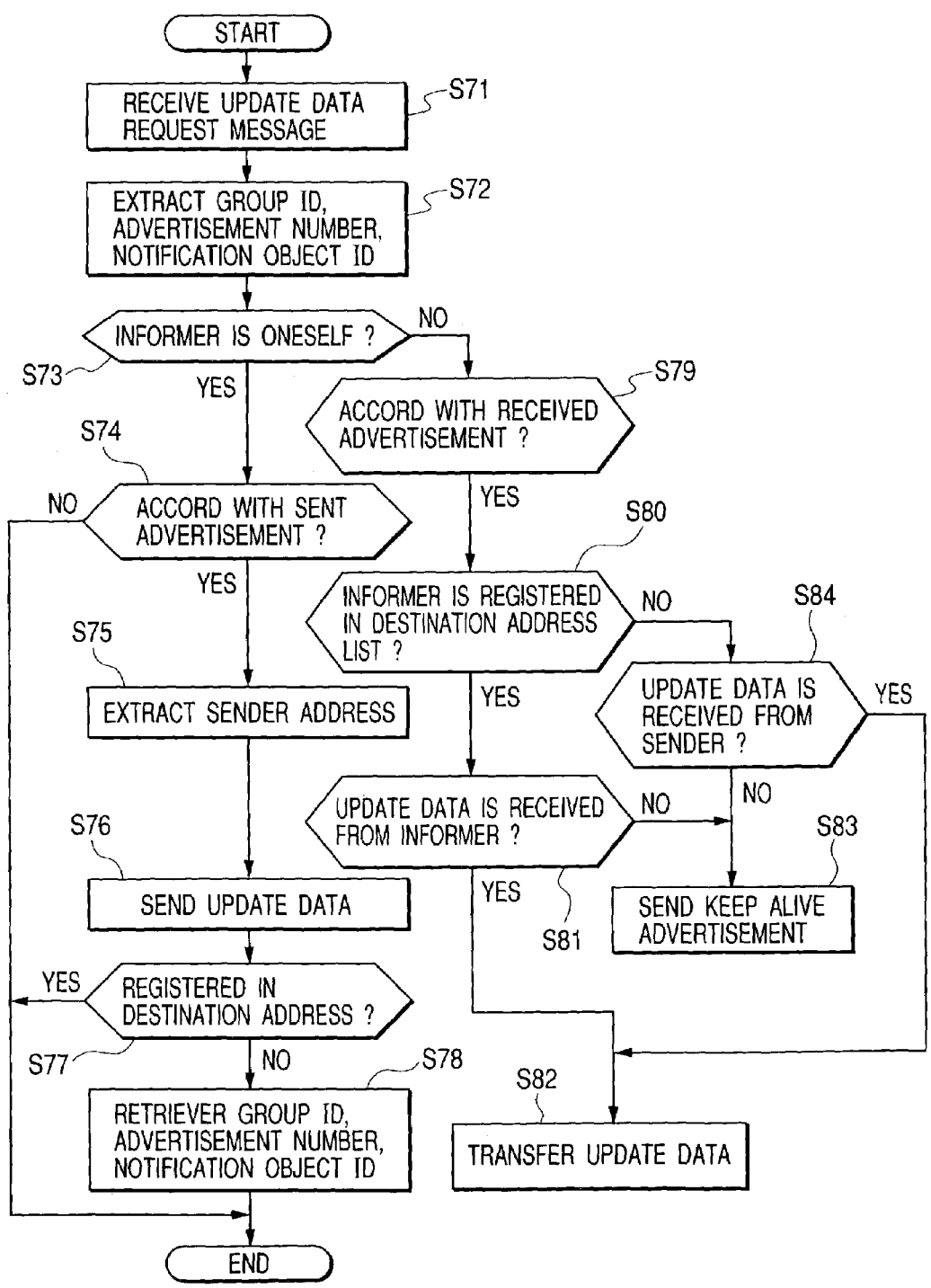
FIG. 17 is a flowchart showing a procedure for a transmitting and receiving processes of the update data request message and update data.

The above control method can be realized by storing programs according to the flowcharts of FIGS. 14 and 17 mentioned above into the storage device in the information notifying terminal and operating them.

The invention is not limited to the apparatuses in the foregoing embodiments but can be applied to a system comprising a plurality of apparatuses or an apparatus comprising one equipment. Naturally, the invention is also accomplished by a method whereby a memory medium in which program codes of software for realizing the functions of the embodiments mentioned above have been stored is supplied to a system or an apparatus and a computer (or a CPU or an MPU) of the system or the apparatus reads out and executes the program codes stored in the memory medium.

In this case, the program codes themselves read out from the memory medium realize the functions of the embodiments mentioned above and the memory medium in which the program codes have been stored constructs the invention. As a memory medium for supplying the program codes, for example, a floppy (registered trademark) disk, a hard disk, an optical disk, a magnetooptic disk, a CD-ROM, a CD-R, a magnetic tape, a non-volatile memory card, or a ROM can be used. Naturally, the invention incorporates not only a case where a computer executes the read-out program codes, so that the functions of the embodiments mentioned above are realized but also a case where an OS or the like which is operating on the computer executes a part or all of actual processes on the basis of instructions of the program codes and the functions of the embodiments mentioned above are realized by those processes.

Further, naturally, the invention also incorporates a case where the program codes read out from the memory medium are written into a memory provided for a function expanding board inserted in a computer or a function expanding unit connected to a computer and, thereafter, a CPU or the like provided for the function expanding board or the function expanding unit processes the expanding function and executes a part or all of actual processes on the basis of instructions of the program codes and the functions of the embodiments mentioned above are realized by those processes.

As described in detail above, according to the invention, since the distributed-type network in which a plurality of terminals connected to the network distribution-process the update notification of the information and the data obtainment can be constructed, the information notifying network system which needs no server can be constructed. Thus, the problem such that the loads are unitarily concentrated on the server as in the conventional technique can be avoided. Further, all of the terminals can immediately obtain the updated information.

Even if there is no server, a group is formed together with the terminal with which each terminal cannot directly communicate and the information can be shared in this group.

If the information on the terminal is updated, the other terminals independently relay the update notification, so that the information can be shared in the group and, further, the load of each terminal can be also distributed.

What is claimed is:

1. An information processing device, comprising:
    a memory storing a destination address to/from which an update notification indicating that data has been updated is informed;
    a receiver which receives update notifications from a plurality of devices;
    a first determining unit which determines whether or not a first update notification that indicates a same update as an update indicated by a second update notification has been received;
    a second determining unit which determines whether or not the second update notification has been passed through other devices other than a first device that stores an updated data;
    a storing unit which, when the first determining unit determines that the first update notification indicating the same update has been received, stores an address of the first device in a case that the second update notification is transferred from the first device, and which stores an address of a second device of the other devices with which a number of hops is a minimum between the second device and the first device in a case that the second update notification is not transferred from the first device; and
    a requesting unit which, when the first determining unit determines that the first update notification indicating the same update has not been received and the second determining unit determines that the second update notification has been passed through the other devices, requests transferring the updated data from the first device in a case that the address of the first device is stored in the destination address, and which requests transferring the updated data from the second device of which the address has been stored in a case that the address of the first device is not stored in the destination address.

2. An information processing device according to the claim 1, wherein the second update notification includes a number of hops indicating the number of times in which the second update notification has been transferred between the devices, and the second determining unit determines based on the number of hops whether or not the second update notification has been passed through the other devices.

3. An information processing device according to the claim 1, wherein, when the second determining unit determines that the second update notification has been passed through the other devices.
    the requesting unit requests transferring the updated data from one of the first and second devices in a case that the address of the first device is not stored as the destination address.

4. An information processing device according to the claim 1, wherein the requesting unit requests transferring the updated data from the first device, when the second determining unit determines that the second update notification has been directly transferred from the first device.

5. An information processing device according to the claim 1, further comprising;
    a transferring unit which transfers the update notification to a device which has an address stored in the destination address by the memory, when the receiver receives the update notification.

6. An information processing device according to the claim 1, further comprising;
    a requesting receiver which receives a request for transferring the updated data,
    wherein the updated data is transferred to a device which has transferred the request for transferring, when the requesting receiver has received the request for transferring the updated data.

7. An information processing device according to the claim 6, wherein, when the requesting receiver has received the request for transferring the updated data, the device which has transferred the request for transferring is directed to wait until receiving the updated data, in a case that the information processing device has not received the updated data.

8. An information processing device according to the claim 1, wherein the memory stores an address of a device which joined a group to be destinations as the destination address, and
    the update notification is informed to the group.

9. An information processing device according to the claim 8, wherein, corresponding to a request for joining the group from an external device which has not joined the group, the memory stores an address of the external device into the destination address.

10. An information processing device according to the claim 8, wherein, when a request for withdrawing from the group is received, an address of a device joining the group is obtained from the device which transfers the request for withdrawing and the obtained address is stored into the destination address, in a case that only an address of the device which transfers the request for withdrawing is stored in the destination address.

11. An information processing device according to the claim 8, wherein the update notification includes an identifier for identifying the group to be the destination.

12. An information processing device according to the claim 1, wherein the update notification includes an identifier for identifying the updated data.

13. A method of controlling an information processing device which has a memory storing a destination address to/from which an update notification indicating that data has been updated is informed, the method comprising:
    a receiving step that receives the update notifications from a plurality of devices;

a first determining step that determines whether or not a first update notification that indicates a same update as an update indicated by a second update notification has been received;

a second determining step that determines whether or not the second update notification has been passed through other devices other than a first device which stores an updated data;

a storing step of, when it is determined at the first determining step that the first update notification indicating the same update has been received, stores an address of the first device in a case that the second update notification is transferred from the first device, and that stores an address of a second device of the other devices with which a number of hops is a minimum between the second and first devices in a case that the second update notification is not transferred from the first device; and a requesting step that, when it is determined by the first determining step that the first update notification indicating the same update has not been received and it is determined at the second determining step that the second update notification has been passed through the other devices, requests transferring the updated data from the first device in a case that the address of the first device is stored in the destination address, and that requests transferring the updated data from the second device of which the address has been stored in a case that the address of the first device is not stored in the destination address.

14. A computer-readable storage medium storing computer-executable process steps, the computer-executable process steps causing a computer to execute the method of claim 13.

* * * * *